US007634816B2

(12) United States Patent
Alkove et al.

(10) Patent No.: US 7,634,816 B2
(45) Date of Patent: Dec. 15, 2009

(54) REVOCATION INFORMATION MANAGEMENT

(75) Inventors: James M. Alkove, Woodinville, WA (US); Ken Reneris, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 728 days.

(21) Appl. No.: 11/202,430

(22) Filed: Aug. 11, 2005

(65) Prior Publication Data

US 2007/0039058 A1 Feb. 15, 2007

(51) Int. Cl.
*G06F 7/04* (2006.01)
(52) U.S. Cl. .............................. 726/27; 726/2; 726/26; 713/158; 705/57
(58) Field of Classification Search .................. 726/27, 726/2, 26; 713/158
See application file for complete search history.

(56) References Cited

U.S. PATENT DOCUMENTS

| 5,224,166 | A | 6/1993 | Hartman, Jr. |
| 6,134,243 | A | 10/2000 | Jones et al. |
| 6,205,140 | B1 | 3/2001 | Putzolu et al. |
| 6,278,478 | B1 | 8/2001 | Ferriere |
| 6,512,778 | B1 | 1/2003 | Jones et al. |
| 6,654,389 | B1 | 11/2003 | Brunheroto et al. |
| 6,856,997 | B2 | 2/2005 | Lee et al. |
| 6,918,034 | B1 | 7/2005 | Sengodan et al. |
| 6,965,646 | B1 | 11/2005 | Firestone |
| 6,983,049 | B2 | 1/2006 | Wee et al. |
| 6,993,137 | B2 | 1/2006 | Fransdonk |
| 7,010,032 | B1 | 3/2006 | Kikuchi et al. |
| 7,080,043 | B2* | 7/2006 | Chase et al. .................. 705/59 |
| 7,120,250 | B2 | 10/2006 | Candelore |
| 7,136,945 | B2 | 11/2006 | Gibbs et al. |
| 7,145,919 | B2 | 12/2006 | Krishnarajah et al. |
| 7,174,452 | B2 | 2/2007 | Carr |
| 7,243,366 | B2 | 7/2007 | Medvinsky et al. |
| 7,257,641 | B1 | 8/2007 | VanBuskirk et al. |
| 7,325,139 | B2 | 1/2008 | Ishiguro et al. |
| 7,346,160 | B2 | 3/2008 | Michaelsen |
| 7,536,418 | B2 | 5/2009 | Buchsbaum et al. |
| 2001/0052135 | A1 | 12/2001 | Balakrishnan et al. |
| 2002/0002674 | A1 | 1/2002 | Grimes et al. |
| 2002/0004773 | A1* | 1/2002 | Xu et al. ....................... 705/36 |
| 2003/0041257 | A1 | 2/2003 | Wee et al. |

(Continued)

FOREIGN PATENT DOCUMENTS

CN 1643474 A 7/2005

(Continued)

OTHER PUBLICATIONS

Curet, et al., "RTP Payload Format for MPEG-4 FexMultiplexed Streams", Internet Engineering Task Force, Internet Draft, XP-001075015, Nov. 8, 2001, 12 pages.

(Continued)

*Primary Examiner*—Kambiz Zand
*Assistant Examiner*—Amare Tabor
(74) *Attorney, Agent, or Firm*—Lee & Hayes, PLLC

(57) ABSTRACT

Systems and/or methods ("tools") are described that enable encrypted media files to be sent without revocation lists while permitting the encrypted media files to be passed to trusted entities. The tools may also ensure continuation of protection when media files are passed between different protection systems.

20 Claims, 4 Drawing Sheets

U.S. PATENT DOCUMENTS

| | | |
|---|---|---|
| 2003/0056118 A1 | 3/2003 | Troyansky et al. |
| 2003/0081592 A1 | 5/2003 | Krishnarajah et al. |
| 2003/0103243 A1 | 6/2003 | Watanabe et al. |
| 2003/0131353 A1 | 7/2003 | Blom et al. |
| 2003/0161473 A1 | 8/2003 | Fransdonk |
| 2004/0042451 A1 | 3/2004 | Takaku |
| 2004/0125757 A1 | 7/2004 | Mela et al. |
| 2004/0125791 A1 | 7/2004 | Hoffmann |
| 2004/0143736 A1 | 7/2004 | Cross et al. |
| 2004/0249759 A1 | 12/2004 | Higashi et al. |
| 2005/0002402 A1 | 1/2005 | Fairman |
| 2005/0002525 A1 | 1/2005 | Alkove et al. |
| 2005/0008240 A1 | 1/2005 | Banerji et al. |
| 2005/0099869 A1 | 5/2005 | Crinon et al. |
| 2005/0157727 A1 | 7/2005 | Date et al. |
| 2005/0163052 A1 | 7/2005 | Savage et al. |
| 2005/0169444 A1 | 8/2005 | Inon |
| 2005/0177875 A1* | 8/2005 | Kamperman et al. .......... 726/27 |
| 2005/0216413 A1 | 9/2005 | Murakami |
| 2005/0254526 A1 | 11/2005 | Wang et al. |
| 2005/0265555 A1 | 12/2005 | Pippuri |
| 2006/0104356 A1 | 5/2006 | Crinon |
| 2006/0130104 A1 | 6/2006 | Budagavi |
| 2006/0161635 A1 | 7/2006 | Lamkin et al. |
| 2006/0167985 A1 | 7/2006 | Albanese et al. |
| 2006/0184790 A1 | 8/2006 | Oliveira et al. |
| 2006/0262732 A1 | 11/2006 | Joutsenvirta et al. |
| 2006/0268099 A1 | 11/2006 | Potrebic et al. |
| 2006/0291475 A1 | 12/2006 | Cohen |
| 2007/0003064 A1 | 1/2007 | Wiseman et al. |
| 2007/0016594 A1 | 1/2007 | Visharam et al. |
| 2007/0016784 A1* | 1/2007 | Vauclair .................... 713/176 |
| 2007/0104105 A1 | 5/2007 | MeLampy et al. |
| 2007/0106814 A1 | 5/2007 | Son et al. |
| 2007/0171903 A1 | 7/2007 | Zeng et al. |
| 2007/0248073 A1 | 10/2007 | Pattavina et al. |
| 2007/0274393 A1 | 11/2007 | Toma et al. |
| 2008/0052751 A1 | 2/2008 | Cromarty et al. |
| 2008/0075168 A1 | 3/2008 | Toma et al. |
| 2008/0126812 A1 | 5/2008 | Ahmed et al. |
| 2008/0187284 A1 | 8/2008 | Ikeda et al. |

FOREIGN PATENT DOCUMENTS

| | | |
|---|---|---|
| EP | 1041823 | 10/2000 |
| EP | 1271830 A2 | 1/2003 |
| EP | 1494425 | 1/2005 |
| RU | 2144736 | 1/2000 |
| RU | 2159507 | 11/2000 |
| WO | WO0011849 | 3/2000 |
| WO | WO03028293 A1 | 4/2003 |
| WO | WO2004023717 | 3/2004 |
| WO | WO2004030364 | 4/2004 |
| WO | WO2004097605 A1 | 11/2004 |

OTHER PUBLICATIONS

Handley, et al., "SDP: Session Description Protocol," The Internet Society, 1998, pp. 1-42.

Klemets, "RTP Payload Format for Video Codec 1 (VC-1)," Microsoft, Feb. 2006, pp. 1-36.

Mehaoua et al, "RTP4mux: A Novel MPEG-4 RTP Payload for Multicast Video Communications over Wireless IP", Retrieved from the Internet Mar. 22, 2005: URL: http//www.polytech.uiv-nantes. PDF.

Proposed SMPTE Standard for Television: VC-1 Compressed Video Bitstream "Format and Decoding Process," The Society of Motion Picture and Television Engineers, Aug. 23, 2005, pp. 1-480.

"RTP Profile for Audio and Video Conferences with Minimal Control", RFC 1890, available at [[http://faqs.org/rfcs/rfc1890.html]], accessed Jan. 7, 2004, 14 pages.

Schulzrinne, et al., "RTP: A Transport Protocol for Real-Time Applications," The Internet Society, 2003, pp. 1-104.

Won-Ho Kim, "Design and Implementation of MPEG-2/DVB Scrambler Unit and VLSI Chip" 1997 International Conference on Consumer Electronics vol. 43 No. 3. pp. 320-321 Jun. 1997.

Official Notice of Rejection For Malaysian Patent Application No.PI 20042167 Mailed On Dec. 2007, pp. 5.

"RTP Payload Format for MPEG-4 Streams", Internet Engineering Task Force, Internet Draft, XP-001033580, Jul. 2001, 41 pages.

PCT International Search Report and Written Opinion in Application PCT/US2006/031185 mailed on Jan. 16, 2007, pp. 1-12. which is a counterpart of the above-captioned application.

"SMPTE Standard for Television, Audio and Film—Time and Control Code", The Society of Motion Picture and Television Engineers, Sep. 12, 1995.

Hoffman, et al., "RTP Payload Format for MPEG1/MPEG2 Video", Network Working Group, RFC 2250, Jan. 1998, pp. 1-16.

* cited by examiner

REVOCATION INFORMATION MANAGEMENT

BACKGROUND

Movies, songs, and other media are often sent to users in an encrypted form. This is usually to protect the media from theft or misuse. But the media still needs to be available for legitimate uses. So some media components are authorized to decrypt and use the media, like some digital video disk (DVD) players or software modules on a computer. These authorized components, when working properly, decrypt media and use it as permitted.

But sometimes an authorized component is found to have an exploit where it can be misused. A person wishing to make an unauthorized copy of a movie, for instance, may find a way to take advantage of such an exploit in a software module that will result in obtaining unauthorized access to the content. When this capability for misuse is learned, the previously authorized component may have its authorization revoked.

Currently, when a component is authorized, it often has a signed certificate proving its authorization. But when the component is compromised, this authorization may be revoked through a revocation list. This list is often sent with each media file so that the receiver of the media file will know whether it should permit particular components to access the media file. This receiver (sometimes called a digital rights management (DRM) device) analyzes the revocation list and determines whether or not to transmit the media file to a component.

But transmitting this revocation list (or lists, as is there are often many of them) can be expensive in terms of network bandwidth. A company that sends a lot of media files, like a cable company or an Internet-based media provider, can spend significant network bandwidth sending revocation lists with media files. Some media providers may even need to transmit the same revocation list for every program they transmit. In addition, sending a proper revocation list with any given content may require infrastructure that some media providers do not yet possess.

This is but one example of a problem with many current protection systems. These systems may also have interoperability problems—such as when a media file cannot be used or properly managed by a receiver that follows a different protection system than the transmitter of the media file.

SUMMARY

Systems and/or methods ("tools") are described that enable encrypted media files to be sent without revocation lists while permitting the encrypted media files to be passed to trusted entities. The tools may also ensure continuation of protection when media files are passed between different protection systems.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes system(s) and/or method(s) ("tools") capable, in some embodiments, of enabling encrypted media files to be sent without revocation lists while permitting the encrypted media files to be passed to trusted entities. In other embodiments, the tools may ensure continuation of protections when media files are used by different protection systems, such as DRM systems. In some cases the tools do so with revocation information having revocation lists and indicia indicating the currency of the revocation lists. These indicia may be passed with (or during transmission of) encrypted media files, thereby enabling entities—even those of different protection systems—to receive the encrypted media files without the revocation lists but still permit the entities to determine what revocation lists are current.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
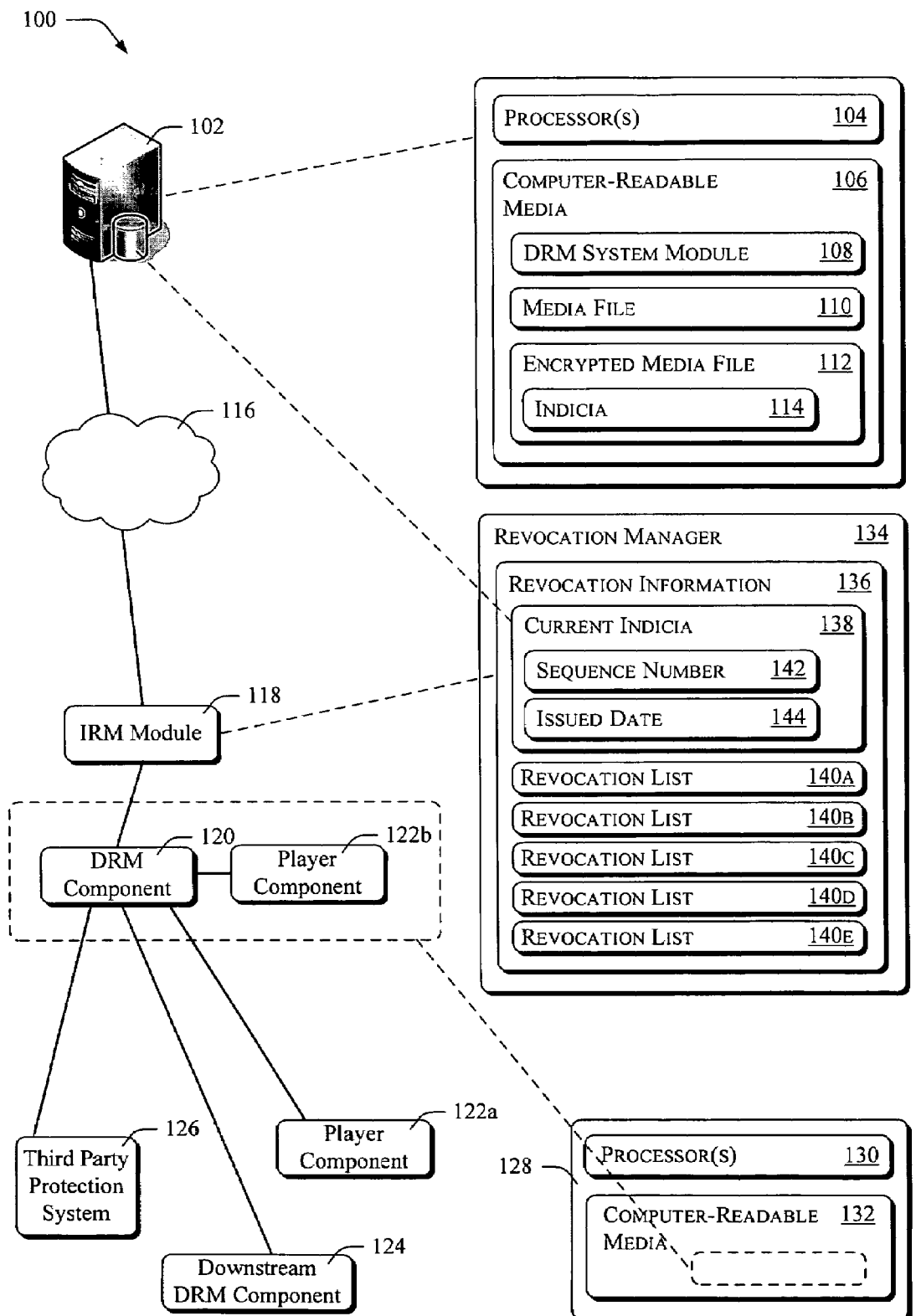
FIG. 1 illustrates an exemplary operating environment in which various embodiments can operate.

FIG. 1 illustrates one such operating environment generally at 100 comprising a server/transmitter 102 having one or more processors 104 and computer-readable media 106. The processors are capable of accessing and/or executing the computer-readable media. The computer-readable media comprises or has access to a DRM system module 108, a media file 110, a secured or encrypted media file 112, and indicia 114. The DRM system module is capable of securing or encrypting and enabling transmission of media files according to a DRM system (e.g., Windows® Media Digital Rights Management™, or WM-DRM), such as media file 110 to provide secured or encrypted media file 112. The operating environment shows a DRM system module, though other protections systems are also contemplated by the tools. These other protections system may include, for example, link protection systems, copy protection systems, systems used in sending media across a cable network, and systems often used with media files transmitted using physical storage. The indicia may indicate revocation information associated with the secured or encrypted media file, such as a sequence number and/or date of one or more revocation lists.

Operating environment 100 also comprises a communication network 116 by which the server/transmitter and intermediate rights management (IRM) module 118 may communicate. This network can comprise a global or local network, such as the Internet, a company's intranet, or a cable network. In some embodiments the server/transmitter communicates without a network, such as through physical media like a digital video disk (DVD), though this is not shown.

The IRM module can be software, hardware, or a combination thereof (e.g., a computer having a processor and computer-readable media). It is capable of receiving secured or encrypted media files, indicia for those media files, and revocation information, and communicating with downstream components, such as a digital rights manager component 120.

The digital rights manager component (DRM component) may also be any combination of software and hardware. It is capable of receiving media files and indicia for those files, and communicating with downstream components, here shown with player components 122a and 122b, a downstream DRM component 124, and a third-party protection system 126. The player components are capable of consuming and rendering the digital media. The downstream DRM component is similar to DRM component 120, and may also be capable of communicating with DRM components, player components, third-party protection systems, or other entities.

The DRM component and player component 122b are shown as computer-readable media and integral with a personal computer 128, though these and the other components, such as 122a, 124, and 126, may each be separate or integrated. The personal computer is shown comprising one or more processors 130 and computer-readable media 132, the computer-readable media having the DRM component and player component 122b.

Operating environment 100 also comprises a revocation manager 134. This manager is capable of creating and/or providing revocation lists and indicia related to these revocation lists, such as sequence numbers and/or dates. Here the manager provides revocation information 136, shown by example with the dashed line to the IRM module, though the revocation information can be provided to other entities as well. The revocation manager can also securely provide the revocation information, such as by digitally signing it. The revocation information is shown having current indicia 138 and five revocation lists 140a through 140e. The current indicia is here shown with a sequence number 142 indicating the sequence or version of the revocation information and an issued date 144. The revocation manager can also provide or enable creation of indicia 114 (e.g., with a same, more, or less current version of current indicia 138), here shown by example with a dashed line to the server/transmitter. The revocation manager may be a module of computer-readable media, such as in computer-readable media 106 and 132, hardware, or otherwise.

Passing Media

Figure 2:
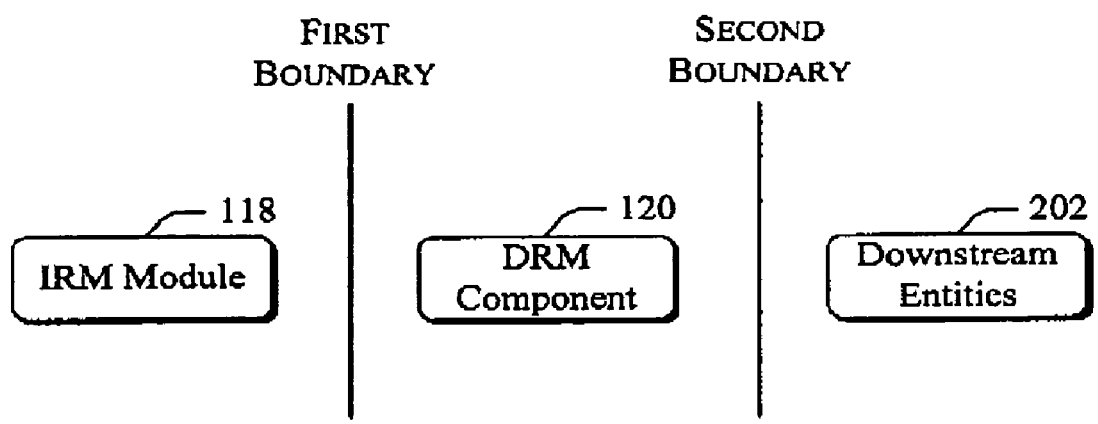
FIG. 2 illustrates a visual representation of entities of the exemplary embodiment of FIG. 1 separated by boundaries.

The tools are concerned with passing media to trusted entities. Server/transmitter 102 is assumed to be trusted, as are IRM module 118 and revocation manager 134. The IRM module, however, is responsible for passing the media to a DRM component that may or may not be trustworthy. The boundary between entities can be illustrated visually, as is shown in FIG. 2. FIG. 2 shows the trusted IRM module separated from a potentially untrustworthy DRM component 120 by a first boundary. Once the DRM is trusted and has received the media, it may need to pass this data onto another as-yet-untrusted downstream entity 202. This is illustrated with a second boundary. The downstream entity may include third-party protection system 126, player components 122, or downstream DRM component 124 of FIG. 1, as well as other components. Additional boundaries may also exist, such as when a downstream entity passes media to yet another entity, and so on.

Before passing media to another entity, the trusted entity having the media determines whether or not the next entity downstream is trustworthy. Exemplary ways in which the tools may do so are set forth below, the first of which addresses passing media from the IRM module to the DRM component.

Determining If a DRM Component is Untrustworthy

The following discussion describes exemplary ways in which the tools can determine if a downstream DRM component is untrustworthy.

Figure 3:
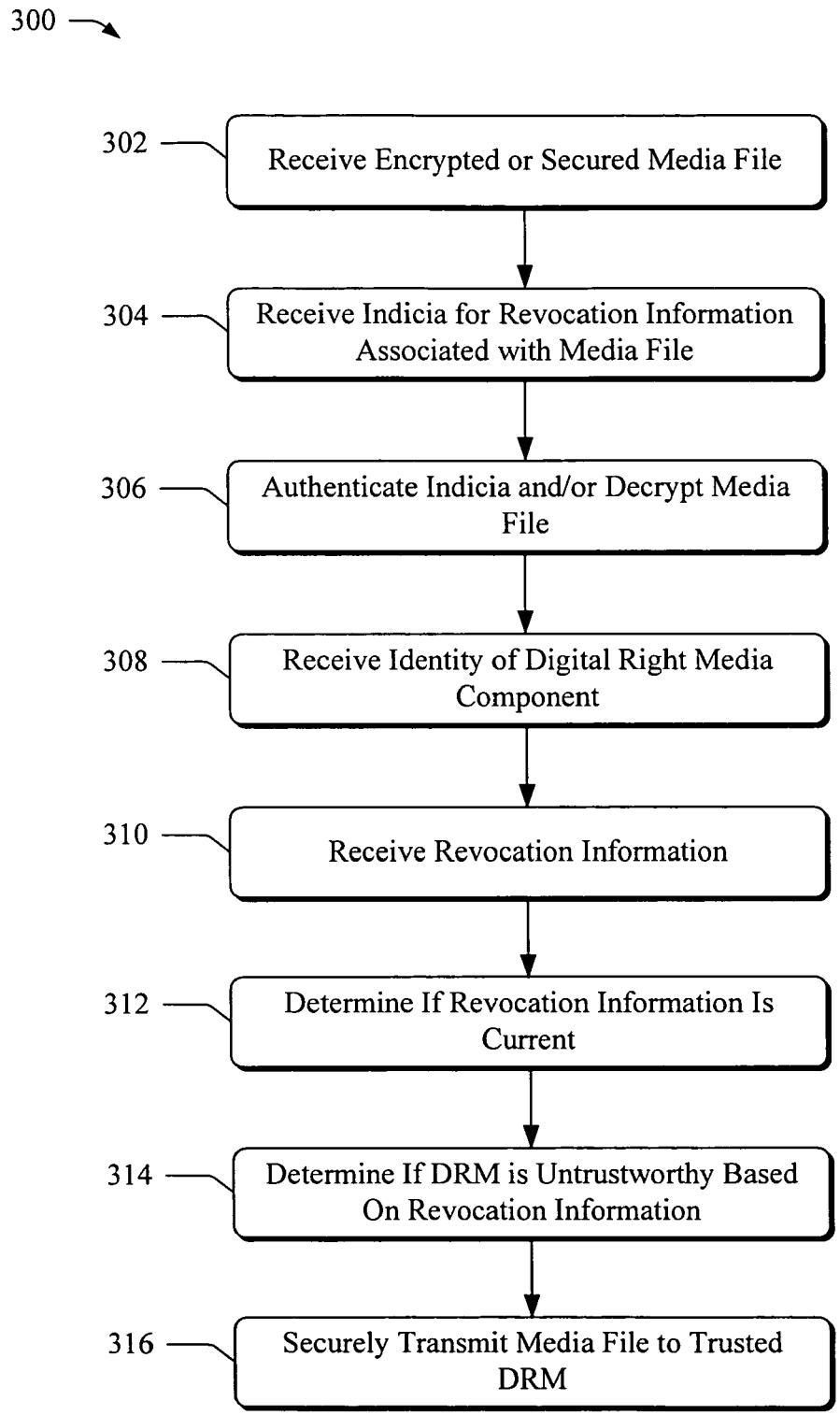
FIG. 3 is an exemplary process for determining if a DRM component is untrustworthy.

In FIG. 3, an exemplary process 300 is shown illustrated as a series of blocks representing individual operations or acts performed by the tools. These operations are described in the context of, but are not limited to, the elements and entities of the operating environment 100 of FIG. 1, such as IRM module 118. This and other processes disclosed herein may be implemented in any suitable hardware, software, firmware, or combination thereof; in the case of software and firmware, these processes represent a set of operations implemented as computer-executable instructions stored in computer-readable media and executable by processor(s).

Block 302 receives an encrypted or secured media file. It can be received over a network, such as network 116, or with physical media, such as a CD ROM or DVD. In the ongoing embodiment, encrypted media file 112 is received across a cable network from server/transmitter 102. The encrypted media file can be tailored to (e.g., encrypted and transmitted in accord with) one of many protection systems, such as a DRM system for use with HTTP protocols, link protection systems, copy protection systems, systems used in sending media across a cable network, or systems often used with media files transmitted using physical storage.

Block 304 receives indicia for revocation information associated with the media file. This indicia can indicate what revocation list or lists should be used with the media file, such as revocation lists that were most current when the media file was encrypted or otherwise secured. The indicia can be received in a secured form separate from or with the media file.

In an illustrated and described embodiment, the IRM module receives indicia 114 secured along with encrypted media file 112. The encrypted media file may be encrypted by the DRM system module 108 along with indicia 114 that was provided to the DRM system by revocation manager 134. The indicia can also be digitally signed (separately or as part of a digital signature of the media file). Here also the indicia comprises a sequence number that is relatively short and takes fewer resources to transmit than a revocation list or lists.

Block 306 authenticates indicia and/or decrypts the secured or encrypted media file, resulting in a clear media file (e.g., media file 110) and readable indicia (e.g., indicia 114). Here the IRM module decrypts the encrypted media file and then authenticates the indicia based on a digital signature of the indicia.

Block 308 receives an identity of a DRM component. This identity is one that is in some way verifiable. Here the IRM module receives a signed certificate having a cryptographic key that identifies DRM component 120.

Block 310 receives revocation information, such as one or more revocation lists and indicia. The revocation information and indicia for it can be received from the DRM component, other sources, or in some cases along with the encrypted media file. The revocation information is protected, such as by being cryptographically signed. Here the IRM module receives, from DRM component 120, a cryptographically signed version of revocation information 136 with current indicia 138 having sequence number 142 and date 144 along with five revocation lists 140a-e.

In some other embodiments, the revocation information does not comprise the revocation lists. Instead, the revocation information indicates current revocation lists (e.g., with current indicia 138 having further indicia for each current revocation list). With these indicia, the current revocation lists may be obtained from various sources (including from revocation manager 134 with the revocation lists being separate from the revocation information). If the IRM module only needs to enforce revocation list 140c, for instance, the IRM module can obtain just this list.

The revocation information indicates untrustworthy downstream entities, such as DRM components. Here revocation information 136 comprises values (e.g., cryptographic hashes of certificates identifying DRM components) that indicate DRM components that are no longer trusted, i.e., ones whose authorization has been revoked. The revocation information can also comprise values for other entities, like player components and third-party protection systems.

Block 312 determines, based on the indicia, whether the received revocation information is at least as current as the revocation information associated with the encrypted media file. In addition, the IRM module may determine if the revocation information is legitimate but older than allowed based on issued date 144.

Once the IRM module knows that the revocation information is legitimate, the IRM module determines if current indicia 142 is at least as current as indicia 114. The IRM module can do so by comparing a sequence number of indicia 114 with sequence number 142 of current indicia 138. If sequence number 142 is equal or larger than the sequence number of indicia 114, the revocation information is deemed current. It may also do so by comparing a date of indicia 114 with issued date 144 of current indicia 138. The date may also be used by the IRM module to timeout revocation information. Thus, even if revocation information 136 is as current or more current than indicia 114 associated with an encrypted media file, if the revocation information is older than a permitted period (e.g., 90 days) IRM module 118 may not pass the media file onto the DRM component.

In some other embodiments, the IRM module does not have indicia 114 and instead relies on having revocation information 136 indicated as current by comparing the current time and date with the issued date 144.

If revocation information 136 is more current than that required by encrypted media file 112, the IRM component may, in some embodiments, use an older revocation list. To do so, the IRM component, directly or indirectly, accesses a revocation list having the same currency as that indicated in indicia 114 for the encrypted media file. This may result in the IRM module passing media to a DRM component that is no longer trusted. While this has a potential security deficit, in some cases it is worth the improved user experience. Assume that a user buys a DVD and plays it on his or her DVD player, which we assume here contains a DRM component. And that two years later, that DVD player's DRM component is compromised and so put on the latest revocation list. It may be desirable for the DVD player to continue to permit play of the previously owned DVD. This can be done using the revocation list that was current at the time the DVD was manufactured.

Block 314 determines whether or not the identified DRM component is indicated as being untrustworthy in the received revocation information. The tools have determined that the received revocation information is at least as current as that required for the media file and thus, that the revocation information can be used to determine if the downstream DRM component is trusted or not.

Here the IRM module determines whether the identified DRM component is untrustworthy by computing a hash of the certificate identifying the DRM component. If the computed hash matches a hash in a revocation list, the DRM component is deemed untrustworthy.

Block 316 securely transmits the media file to the trusted DRM. In some cases IRM Module 118 is tightly integrated with DRM component 120 or otherwise is able to transmit the media file securely without having to encrypt the media file. In some other cases, block 316 encrypts the media file such that it can be decrypted by the trusted DRM component.

Here the IRM component encrypts the media file using the DRM component's encryption key that identified the DRM component at block 308. Block 316 also securely transmits the indicia indicating the revocation information associated with the media file or the revocation information itself. In some situations bandwidth is much less of an issue after a media file is received by the IRM module, such as when the IRM module communicates with the DRM component within a computer.

In some cases block 316 tailors the media file according to the same DRM system originally used with the media file. The media file may have been tailored to a DRM system, however, that is generally not used by a downstream DRM component of a different type or some other downstream entity. For this reason, block 316 may also tailor the media file in accord with another DRM system.

In the ongoing illustrated embodiment, the IRM module received encrypted media file 112, which was tailored by DRM system module 108 according to a DRM system used by a cable company for transmittal of files over a cable network. The DRM component, however, instead follows a DRM system for transmitting files using HTTP. By tailoring the media file, the IRM module enables a media file tailored to one DRM system to be transmitted and used downstream by entities following other DRM systems. The tools may permit this with other entities in addition to the IRM module, thereby generally enabling interoperability between different DRM systems.

Determining If a Downstream Entity Is Untrustworthy

The following discussion describes exemplary ways in which the tools can determine if a downstream entity is untrustworthy.

Figure 4:
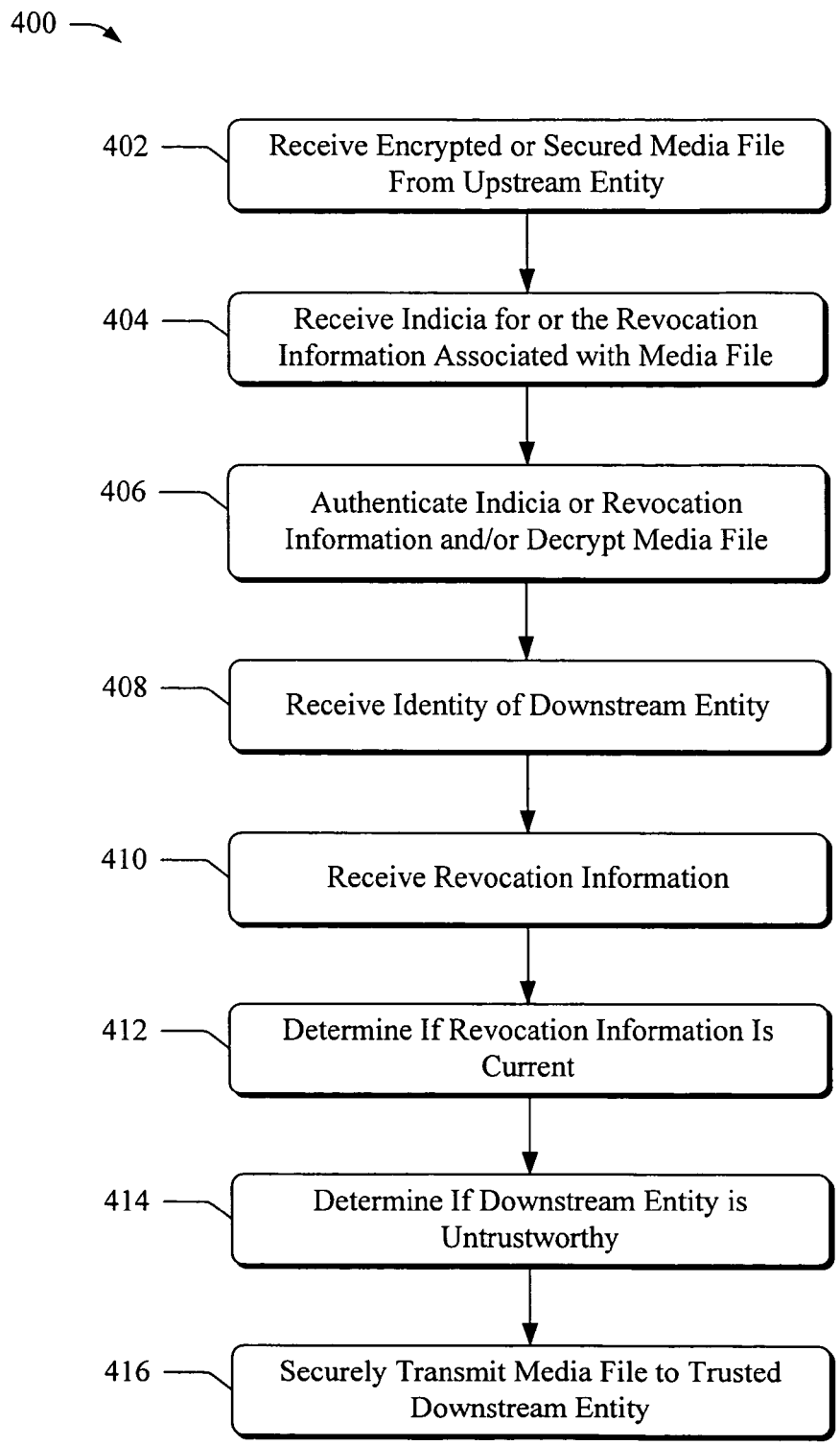
FIG. 4 is an exemplary process for determining if a downstream entity is untrustworthy.

In FIG. 4, an exemplary process 400 is shown illustrated as a series of blocks representing individual operations or acts performed by the tools. These operations are described in the context of, but are not limited to, the elements and entities of the operating environment 100 of FIG. 1, such as DRM component 120. Note that process 400 has similarities to process 300. Many of the similarities between these processes stem from the DRM component in process 400 (or some future entity) acting similarly to the IRM module in process 300.

Block 402 receives a secure or encrypted media file from an upstream entity. Continuing the ongoing embodiment, DRM component 120 receives an encrypted media file and revocation information. The encrypted media file is received in a manner decryptable by the DRM component. The revocation information is received capable of being authenticable by the DRM component.

Block 404 receives indicia for the revocation information associated with the media file or the revocation information itself. Here the DRM component receives the revocation information itself along with the media file.

Block 406 authenticates the indicia or revocation information and/or decrypts the encrypted media file. With the indicia the DRM component may find the correct revocation information (which it may already have). This revocation information indicates, like before, downstream entities that may not be trustworthy. In some other cases, such as those where the entity receiving the encrypted media file and indicia is not a DRM component or is a further-downstream DRM component, the media file can be decrypted with the entity's content key and the revocation information verified in ways well known in the art (e.g., using a public key).

Block 408 receives an identity of a downstream entity (e.g., downstream entity 202 of FIG. 2). Here the DRM component receives a signed certificate having a cryptographic key that identifies the downstream entity. The entity may be one of many types of components or systems—here it is a player television, shown in FIG. 1 as player component 122a.

If the media file includes only the indicia and not the revocation list(s), Block 410 receives the revocation information which may or may not be current. The revocation information may be received, as mentioned above, from the downstream entity or another source. It can be of a form similar to that of revocation information 136 of FIG. 1.

Block 412 determines, based on the indicia, whether the received revocation information is at least as current as the revocation information associated with the media file. Here the DRM component determines if the revocation information is authentic with a public key held by the DRM by verifying the digital signature of the revocation information. The DRM component then compares the indicia in the revocation information associated with the media file (which here was received with the file) with indicia of the received revocation information from block 410.

Block 414 determines whether or not the identified downstream entity is trustworthy by checking to ensure that it is not listed in the received revocation information as being untrustworthy. Block 414 can determine this as set forth for block 314 above.

Block 416 securely transmits the media file to the trusted downstream entity. In some cases DRM component is tightly integrated with downstream entity or otherwise is able to transmit the media file securely without having to encrypt the media file. In some other cases, block 316 encrypts the media file such that it can be decrypted by the trusted downstream entity.

Here the DRM component encrypts the media file such that it can be decrypted by the now-trusted downstream entity. The DRM component does so using player component 122a's public encryption key that identified the player component at block 408. In some embodiments, block 416 transmits the media file with less than all of the revocation information. In some situations the tools know that the downstream entity does not need or want all of the information. If the DRM component knows that the next downstream entity only needs to understand one revocation list, it may only send one revocation list. This permits the downstream entity to operate potentially with a smaller amount of processing requirements, which can make the downstream entity less expensive to build or use.

Block 416 can also securely bind the media file with indicia or revocation information sufficient for additional downstream entities to continue this process indefinitely. Block 416 can encrypt the media file, pass it to another entity, and this entity can in turn receive it, determine if the next downstream entity is trusted, and so continue this process.

In some situations, however, the process ends at the next downstream entity. This may be because the next entity is not fully trustworthy or not capable of maintaining the chain of trust to future entities. It may also be because the tools know that the next entity does not need to pass the media onto another entity, often because that entity is consuming the media.

Here the next downstream entity is a plasma television. Recapping this exemplary embodiment, note that the media file is a movie first encrypted by a cable company's server/transmitter. It was then sent to the IRM module, which then securely sent it to the DRM component. The DRM component then securely sent it to the plasma television where it can be played. Also note that the media file was tailored in accord with at least two different DRM systems, here by the cable company and then by the IRM module. The DRM component can also be capable of tailoring the media file in accord with yet another DRM system, though here we assume that the plasma television is able to receive a media file tailored to a DRM system addressing transmission of media files using HTTP.

CONCLUSION

The above-described systems and methods enable encrypted media files to be sent without revocation lists while permitting the encrypted media files to be passed to trusted entities. They may also enable media files to pass safely between different DRM systems. In so doing, these systems and methods may save significant network overhead and permit interoperability between digital rights management systems. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. A computer-implemented method comprising:
receiving an encrypted media file at a computing device, the encrypted media having indicia for a revocation list associated with the encrypted media file but not having the associated revocation list, wherein the indicia indicate whether the associated revocation list is at least as current as revocation list previously loaded in the computing device;
receiving an identity of a digital rights management component of the computing device;
receiving the associated revocation list, the received revocation list indicating one or more untrustworthy digital rights management components that are not authorized to access the encrypted media;
determining, based on the indicia, that the received revocation list is at least as current as the previously loaded revocation list;
determining whether the identified digital rights management component is untrustworthy based on the received revocation list when the received revocation list is at least as current as the previously loaded revocation list; and
transmitting media from the encrypted media file to the identified digital rights management component when the identified digital rights management component is not untrustworthy.

2. The method of claim 1, wherein the encrypted media file is tailored to a first digital rights management (DRM) system, further comprising decrypting the encrypted media file to provide a decrypted media file, and tailoring the decrypted media file to a second DRM system different from the first DRM system.

3. The method of claim 1, wherein the indicia is cryptographically associated with the encrypted media file and further comprising authenticating the indicia prior to determining that the received revocation list is at least as current as the associated revocation list.

4. The method of claim 1, wherein the receiving the identity includes receiving a signed certificate, the signed certificate identifying the digital rights management component, and wherein the determining of whether the identified digital rights management component is untrustworthy includes computing a hash of the certificate and comparing the hash with one or more received hashes from the received revocation list, the hash matching one of the received hashes indicating that the identified digital rights management component is untrustworthy.

5. The method of claim 1, wherein the receiving includes receiving a securely transferred value representing the digital rights management component, and wherein the determining of whether the identified digital rights management component is untrustworthy includes comparing the value with one or more received values in the received revocation list, the value matching one of the received values indicating that the identified digital rights management component is untrustworthy.

6. The method of claim 1, wherein the indicia comprises at least one of a date-time stamp or a version number.

7. The method of claim 1, wherein the indicia comprises a version number in the form of a sequence number that indicates whether the received revocation list is at least as current as the associated revocation list.

8. The method of claim 1, wherein the revocation list includes one or more cryptographic hashes, each cryptographic hash identifying one of the one or more untrustworthy digital rights management components.

9. The method of claim 1, wherein the received revocation list is received from the identified digital rights management component.

10. A computer-implemented method comprising:
providing first indicia capable of being transmitted securely along with a media file to a computing device, the first indicia indicating a currency of first revocation information including, or referring to, one or more first revocation lists usable in a digital rights management system of the computing device;
providing second indicia to the computing device, the second indicia indicating a currency of second revocation information including, or referring to, one or more second revocation lists;
comparing the second indicia to the first indicia to determine whether the one or more second revocation lists are as current or more current than the one or more first revocation lists; and
providing the one or more second revocation lists to the computing device when the one or more second revocation lists are as current or more current than the one or more first revocation lists, the one or more second revocation lists enabling a component in the digital rights management system to determine entities on the computing device that are authorized to receive the media file; and
providing the media file to entities on the computing device that are determined to be authorized to receive the media file.

11. The method of claim 10, wherein each of the first indicia or the second indicia comprises at least one of a date-time stamp or a version number.

12. The method of claim 10, wherein the providing enables the media file to be passed to an entity of a second digital rights management system whose authorization to receive the media file has not been revoked.

13. The method of claim 10, further comprising providing third indicia indicating a currency of third revocation information including one or more revocation lists, the third indicia comparable to the second indicia sufficient to determine whether the third revocation information or its revocation lists are as current or more current that the second revocation information or its revocation lists and providing the third revocation information or one or more of its revocation lists effective to enable a second component in the digital rights management system to determine entities whose authorization to receive the media file have been revoked.

14. A computer-implemented method comprising:
receiving cryptographically signed revocation information at a computing device including, the revocation information including, or referring to, one or more revocation lists and indicia indicating a currency of the revocation lists, wherein the indicia includes at least one of a first date-time stamp or a first version number;
determining at the computing device, based on the indicia and other indicia bound to an encrypted media file, whether the one or more revocation lists are current; and
determining at the computing device, if the one or more revocation lists are current and based on the one or more revocation lists, downstream entities that are untrustworthy to receive media from the encrypted media file.

15. The method of claim 14, further comprising transmitting the media from the encrypted media file to a downstream entity determined to be not untrustworthy.

16. The method of claim 15, wherein the receiving and the determining are performed by an entity upstream from the downstream entity and also by the downstream entity.

17. The method of claim 15, further comprising tailoring the media to a digital rights management system different from a digital rights management system to which the encrypted media file was tailored.

18. The method of claim 15, wherein the receiving includes receiving the cryptographically signed revocation information from the downstream entity.

19. The method of claim 14, further comprising receiving the encrypted media file having the other indicia and decrypting the encrypted media file and the other indicia.

20. The method of claim 14, wherein the determining of whether the revocation lists included in the cryptographically signed revocation information are current comprises comparing at least one of the first version number or the first date-time stamp included the indicia with at least one of a second version number or a second date-time stamp in the other indicia, wherein at least one of the first version number or the first date-time stamp in the indicia being equal or greater than the corresponding second version number or the corresponding second date-time stamp in the other indicia indicating that the cryptographically signed revocation information or the revocation lists are current.

* * * * *